Patented Nov. 20, 1951

2,575,760

UNITED STATES PATENT OFFICE 2,575,760

PREPARATION OF HEAVY METAL BOROHYDRIDES

Henry R. Hoekstra, Park Forest, and Joseph J. Katz, Chicago, Ill., assignors to the United States of America as represented by the United States Atomic Energy Commission No Drawing. Application May 17, 1950, Serial No. 162,598

9 Claims. (Cl. 23—17)

This invention relates to a method of preparing highly volatile heavy metal compounds. It is particularly concerned with borohydrides of hafnium and zirconium and with methods of producing these novel compounds.

Hafnium and zirconium are adjacent members of the IV–B group of elements and can be referred to as "zirconium-type elements." Zirconium, which is the more abundant of these two elements, is always found in nature contaminated with hafnium. Many of the uses of zirconium require that this element be substantially freed from the hafnium component. The separation of zirconium from hafnium, however, has been extremely difficult because of the very great chemical similarily of these two elements. One method of separating such closely related elements is the gaseous diffusion method. By this method, volatile compounds of the elements to be separated are vaporized and the vapor permitted to diffuse through a permeable barrier. Because of the difference in atomic weight of the compounds, there is a difference in the tendency of the respective compounds to diffuse through the barrier, thus resulting in a separation of the compounds. The method, however, requires that volatile compounds of the elements to be separated must be prepared.

It is an object of the present invention to provide novel and volatile compounds of zirconium and hafnium.

It is an additional object of the present invention to provide a method of preparing these volatile compounds of zirconium and hafnium.

Further objects and advantages will appear from the following description.

In accordance with the present invention, it has been found that zirconium borohydride and hafnium borohydride are novel volatile compounds of these two elements, having very desirable properties for use in zirconium-hafnium separation by barrier vapor diffusion methods. It has further been found that the borohydrides of these two group IV–B elements may be obtained by the reaction of a metal borohydride with an alkali metal group IV–B metal halide double salt.

The borohydrides of the metals having an electro-negativity of greater than about one in the scale shown by L. Pauling on p. 64 of Nature of the Chemical Bond, Cornell University Press of New York, 1940 edition, are most suitable for use in the preparation of the zirconium and hafnium borohydrides. Beryllium and aluminum borohydrides have been found to be particularly effective starting materials for the preparation of the zirconium and hafnium borohydrides. The metal borohydride is reacted with an alkali metal zirconium (or hafnium) halide double salt. Such a double salt may be prepared by fusing the zirconium (or hafnium) tetrahalide with the halide of an alkali metal. The most suitable alkali metal halides are the sodium and potassium, chlorides and fluorides. Contrary to what might be expected from prior art, zirconium or hafnium borohydrides cannot be prepared by reacting the binary zirconium or hafnium halide with a metal borohydride.

A preferred process is the reaction of the sodium-zirconium (or hafnium) pentafluoride with aluminum borohydride. The products of the reaction are zirconium (or hafnium) borohydride, aluminum fluoride, or aluminum fluoro-borohydrides and sodium fluoride, as illustrated by the following equation:

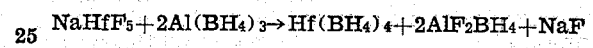

$$NaHfF_5 + 2Al(BH_4)_3 \rightarrow Hf(BH_4)_4 + 2AlF_2BH_4 + NaF$$

Where one of the reacants is a liquid (as is the Al(BH4)3 in the equation above), the reaction proceeds without any other medium. However, where the reactants used are all solids, the use of a non-aqueous medium, such as ethyl ether, can be advantageous.

Due to the great inflammability of the aluminum, beryllium, zirconium and hafnium borohydrides when exposed to dry air, it is greatly desirable to carry out the reaction of these materials under inert conditions. Thus, the reaction may be carried out under vacuum conditions or in the presence of an inert gas such as nitrogen, argon or helium.

The method of carrying out the reaction to produce the zirconium and hafnium borohydrides is not critical and any conventional method of reacting such reactants as these may be employed. One method of preparing zirconium borohydride by the novel reaction of the present invention comprises introducing the anhydrous NaZrF5 into a reaction chamber. This reaction chamber is then evacuated and an excess of gaseous aluminum borohydride introduced into the reaction chamber and condensed on the NaZrF5. The reaction chamber is sealed off and the reactants permitted to stand at room temperature for several days. Where a metal borohydride less reactive than aluminum borohydride, is used in the reaction, it may be desirable to maintain the temperature of the reaction chamber at greater than room temperature, for example 50° to 60° C., in order to increase the speed of the reaction. Upon completion of the reaction, the reaction chamber may again be introduced into a vacuum system and the reaction products separated by thermal fractionation. The aluminum borohydride is most volatile having a boiling point of approximately 44.5° C. and will be vaporized first.

The zirconium and hafnium borohydrides have boiling points (extrapolated) of 123° and 118° C., respectively. The sodium fluoride and $AlF_2BH_4$ are comparatively non-volatile and will remain as residues in the reaction chamber during the thermal fractionation process. If beryllium borohydride is used instead of the aluminum borohydride, it will also be volatilized before the zirconium or hafnium borohydride since it has a boiling point of approximately 91.3° C.

The following example illustrates the process of making the products of the present invention. All parts are by weight unless otherwise stated.

EXAMPLE

The double salt $NaHfF_5$ was prepared by fusing hafnium tetrafluoride with an equimolecular quantity of sodium fluoride. A quantity of 0.8768 g. (2.52 millimoles) of the $NaHfF_5$ was introduced into a reaction chamber and the chamber then evacuated. An excess (211.6 cc. at S. T. P.; 9.45 millimoles) of aluminum borohydride was distilled into the reaction chamber and condensed on the $NaHfF_5$. The chamber was then sealed off and the reactants allowed to stand for several days at room temperature. The reaction chamber was then introduced into a vacuum system which was freed of air and the volatile components were pumped off and fractionated. The fractionation was effected by pumping off the volatile contents of the reaction chamber through a series of two condensation chambers immersed, respectively, in an ice-salt mixture and in liquid nitrogen. The hafnium borohydride was condensed in the ice-salt mixture-cooled condensation chamber, and the more volatile aluminum borohydride condensed in the liquid nitrogen-cooled condensation chamber. The hafnium borohydride, a white crystalline solid melting at 29° C., with a vapor pressure of about 15 mm. at 25° C., was then resublimed in vacuum at room temperature to further purify the compound.

Zirconium borohydride was prepared in the same manner as the hafnium borohydride.

The formula of the hafnium borohydride was established by hydrolysis and a determination of the Hf:B:H ratio. Boron was determined by distillation as methyl borate and titration of the liberated boric acid; the metals were estimated gravimetrically as oxides. The empirical formula obtained on complete analysis was $Hf_{1.03}B_{3.98}H_{16.00}$ [$Hf(BH_4)_4$]. Analysis of the zirconium borohydride gave the formula $$Zr_{1.04}B_{4.06}H_{16.00} \ [Zr(BH_4)_4]$$

The physical properties of the zirconium and hafnium borohydrides were determined. It was found that these compounds are the most volatile of the known zirconium and hafnium compounds. Certain of the physical properties are shown in the tables which follow.

*Table I*

| Compound, temp., ° C. | Vapor Pressures (mm. Hg.) | |
|---|---|---|
| | Hafnium borohydride | Zirconium borohydride |
| 0 | 2.2 | 1.8 |
| 10 | 4.7 | 4.2 |
| 25 | 14.9 | 15.0 |
| 30 | 21.0 | 20.3 |
| 40 | 36.0 | 33.2 |
| 50 | 56.4 | 52.2 |

*Table II*

| Property | Hafnium borohydride | Zirconium borohydride |
|---|---|---|
| Melting point in ° C | 29.0 | 28.7 |
| Boiling point (extrapolated) | 118 | 123 |
| Heat of sublimation, kcal./mole | 13.0 | 13.6 |
| Heat of vaporization, kcal./mole | 9.6 | 9.3 |
| Heat of fusion, kcal./mole | 3.4 | 4.3 |

The above detailed description is given for purposes of illustration and specific details thereof are not intended to limit the scope of the invention which is to be limited only by the following claims.

What is claimed is:

1. A group IV-B metal borohydride wherein the metal is a member of the group consisting of hafnium and zirconium.

2. A hafnium borohydride characterized by having a melting point of 29° C. and a boiling point of 118° C.

3. A zirconium borohydride characterized by having a melting point of 28.7° C. and a boiling point of 123° C.

4. The method of preparing a zirconium-type metal borohydride of the group consisting of zirconium borohydride and hafnium borohydride, which comprises reacting under an inert atmosphere an alkali metal zirconium-type metal halide double salt with a borohydride of a metal having an electronegativity of greater than about 1 on the Pauling scale.

5. The process of preparing hafnium borohydride, which comprises reacting under an inert atmosphere sodium-hafnium fluoride with aluminum borohydride.

6. The process of preparing zirconium borohydride, which comprises reacting under an inert atmosphere sodium-zirconium fluoride with aluminum borohydride.

7. The process of preparing hafnium borohydride, which comprises reacting under an inert atmosphere a borohydride of a metal having an electronegativity of greater than about 1 on the Pauling scale with an alkali metal hafnium halide in ethyl ether medium.

8. The process of preparing zirconium borohydride, which comprises reacting aluminum borohydride with sodium-zirconium pentafluoride in a vacuum, distilling off and recovering the unreacted aluminum borohydride, and distilling off and recovering the zirconium borohydride.

9. The process of preparing hafnium borohydride, which comprises reacting beryllium borohydride with sodium-hafnium pentachloride in a vacuum, distilling off and recovering the unreacted beryllium borohydride, and distilling off and recovering the hafnium borohydride.

HENRY R. HOEKSTRA.
JOSEPH J. KATZ.

No references cited.